(12) United States Patent
Villeval et al.

(10) Patent No.: US 10,754,007 B2
(45) Date of Patent: Aug. 25, 2020

(54) METHOD AND APPARATUS FOR COMPENSATING RADAR CHANNEL LENGTH VARIATION

(71) Applicant: GM GLOBAL TECHNOLOGY OPERATIONS LLC, Detroit, MI (US)

(72) Inventors: Shahar Villeval, Tel Aviv (IL); Oren Longman, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 163 days.

(21) Appl. No.: 16/013,090

(22) Filed: Jun. 20, 2018

(65) Prior Publication Data
US 2019/0391231 A1    Dec. 26, 2019

(51) Int. Cl.
*G01S 7/40* (2006.01)
*G01S 7/35* (2006.01)

(52) U.S. Cl.
CPC ...... *G01S 7/40* (2013.01); *G01S 7/35* (2013.01); *G01S 7/4008* (2013.01); *G01S 7/4021* (2013.01)

(58) Field of Classification Search
CPC ........ G01S 7/40; G01S 7/4021; G01S 7/4008; G01S 7/35; G01S 13/42; G01S 13/931; G01S 7/282; G01S 7/352; G01S 7/4865; G01S 7/486
See application file for complete search history.

(56) References Cited

U.S. PATENT DOCUMENTS

| | | | |
|---|---|---|---|
| 5,952,955 A * | 9/1999 | Kennedy | G01S 7/4021 342/102 |
| 2013/0016003 A1* | 1/2013 | Stirling-Gallacher | H01Q 3/26 342/174 |
| 2016/0131752 A1* | 5/2016 | Jansen | G01S 13/343 342/27 |

* cited by examiner

*Primary Examiner* — Olumide Ajibade Akonai
(74) *Attorney, Agent, or Firm* — Cantor Colburn LLP

(57) ABSTRACT

A method and apparatus that compensate radar channel length variation are provided. The method includes transmitting a signal from the transmitter, determining a response of each of the receivers to the transmitted signal, and storing the determined responses; for each stored response of the stored responses, calculating a path length of the transmitted signal; for each of the transmitters, determining and storing a median receive path difference in the path length between a transmitter and each receiver; for each receiver of the receivers, determining and storing a median receive path difference in the path length between a receiver and each transmitter; and compensating for the median receive path difference and the median transmit path difference by performing a frequency shift on or time delaying a signal to be transmitted by a transmitter or received by a receiver.

20 Claims, 3 Drawing Sheets

METHOD AND APPARATUS FOR COMPENSATING RADAR CHANNEL LENGTH VARIATION

INTRODUCTION

Apparatuses and methods consistent with exemplary embodiments relate to multi-channel radars. More particularly, apparatuses and methods consistent with exemplary embodiments relate to relate to multi-channel radars with variable channel lengths.

SUMMARY

One or more exemplary embodiments provide a method and an apparatus that calibrate and compensate radar channels. More particularly, one or more exemplary embodiments provide a method and an apparatus that calibrate and compensate channel length variations at both the transmit and the receive channels of radars.

According to an aspect of an exemplary embodiment, a method that compensates radar channel length variation is provided. The method includes: for each transmitter of N transmitters, transmitting a signal from the transmitter, determining a response of M receivers to the transmitted signal, and storing the determined response; for each stored response of the M×N stored responses, calculating a path length of the transmitted signal corresponding to the stored response; for each transmitter of the N transmitters, determining a median difference in the path length between a transmitter and each receiver of the M receivers and storing a determined median receive path difference; for each receiver of the N receivers, determining a median difference in the path length between a receiver and each transmitter of the N transmitters and storing a determined median transmit path difference; and compensating for the median receive path difference and the median transmit path difference by performing a frequency shift on or time delaying a signal to be transmitted by a transmitter or a reflected signal received by a receiver.

The determining the response of M receivers may include determining one or more from among a time of flight, an amplitude, and a phase of a signal transmitted by the transmitter and received by a receiver after the signal is reflected off a reference target and received by the receiver.

The compensating for the median receive path difference and the median transmit path difference may include time delaying a signal.

The compensating for the median receive path difference and the median transmit path difference may include applying a correcting frequency shift based on the median receive path difference and the median transmit path difference.

The compensating for the median receive path difference and the median transmit path difference may include applying a frequency shift by multiplication with a single tone exponent superimposed on windowing coefficients before performing a range Fast Fourier Transform.

The compensating for the median receive path difference and the median transmit path difference may include mixing a signal using a mixer to correct frequency.

The path length may be a distance a signal travels from a transmitter to a reference target and back to a receiver that receives the signal.

According to an aspect of another exemplary embodiment, a non-transitory computer readable medium comprising computer executable instructions executable by a processor to perform the method that compensates radar channel length variation is provided.

According to an aspect of another exemplary embodiment, an apparatus that compensates radar channel length variation is provided. The apparatus includes N transmitters with variable channel lengths, where is N greater than or equal to 2, M receivers with variable channel lengths, where is M greater than or equal to 2, at least one memory comprising computer executable instructions; and at least one processor configured to read and execute the computer executable instructions. The computer executable instructions cause the at least one processor to for each transmitter of the N transmitters, transmit a signal from the transmitter, determine a response of the M receivers to the transmitted signal, and store the determined response; for each stored response of the M×N stored responses, calculate a path length of the transmitted signal corresponding to the stored response; for each transmitter of the N transmitters, determine a median difference in the path length between a transmitter and each receiver of the M receivers and store a determined median receive path difference; for each receiver of the M receivers, determine a median difference in the path length between a receiver and each transmitter of the N transmitters and store a determined median transmit path difference; and compensate for the median receive path difference and the median transmit path difference by performing a frequency shift on or time delaying a signal to be transmitted by a transmitter or a reflected signal received by a receiver.

The computer executable instructions may cause the at least one processor to determine the response of M receivers by determining one or more from among a time of flight, an amplitude, and a phase of a signal transmitted by the transmitter and received by a receiver after the signal is reflected off a reference target and received by the receiver.

The computer executable instructions may cause the at least one processor to compensate for the median receive path difference and the median transmit path difference by time delaying a signal.

The computer executable instructions may cause the at least one processor to compensate for the median receive path difference and the median transmit path difference by applying a correcting frequency shift based on the median receive path difference and the median transmit path difference.

The computer executable instructions may cause the at least one processor to compensate for the median receive path difference and the median transmit path difference by applying a frequency shift by multiplication with a single tone exponent superimposed on windowing coefficients before performing a range Fast Fourier Transform.

The computer executable instructions may cause the at least one processor to compensate for the median receive path difference and the median transmit path difference by mixing a signal using a mixer to correct frequency.

Other objects, advantages and novel features of the exemplary embodiments will become more apparent from the following detailed description of exemplary embodiments and the accompanying drawings.

DETAILED DESCRIPTION

Figure 1:
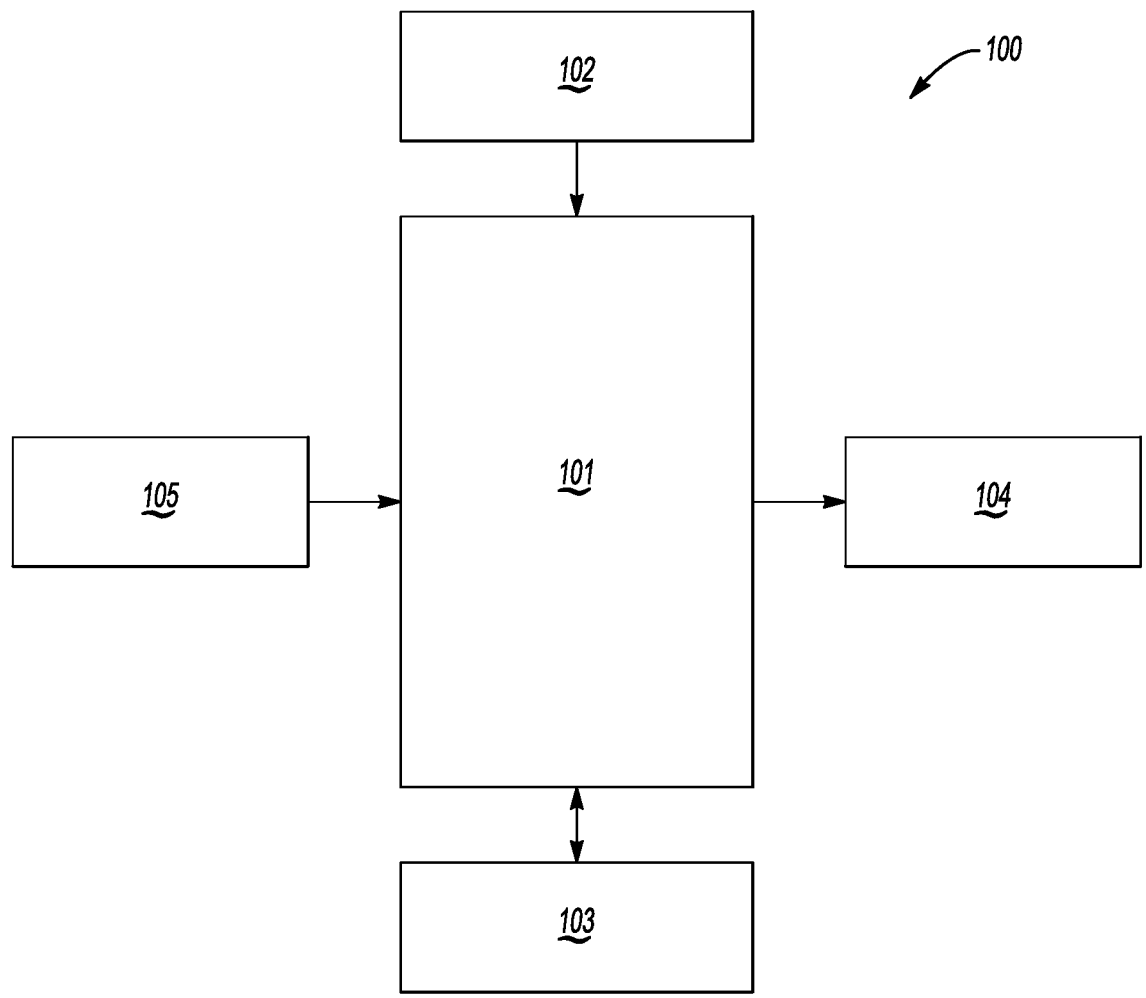
FIG. 1 shows a block diagram of an apparatus that compensates radar channel length variation according to an exemplary embodiment.

An apparatus and method that compensate radar channel length variation will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Vehicles such as a passenger car, trucks, sports utility vehicles (SUVs), recreational vehicles (RVs), marine vessels, aircraft, etc., are being equipped with radar, imaging and/or vision systems. For example, vehicles may have radar transmitters and receivers facing one or more areas around a vehicle. The information from the radars may be used to perceive or capture images of an environment around a vehicle by transmitting radio frequency signals and capturing reflected radio frequency signals. The information may also be analyzed to determine the presence of objects and/or other indicators or interest.

In multi-channel radar systems, it is desirable to have elements in an array to have a uniform response. The uniformity provides the same response in delay and attenuation. In one example, of a linear frequency modulated continuous wave radar (LFMCW), the difference in delay modulates the same target onto different frequencies and decrease the array gain in processing. Thus, compensating for these differences and canceling them is desirable.

In a LFMCW, a linear frequency continuous wave radio energy is transmitted and then received from any reflecting objects. The transmitted signal of a linear frequency continuous wave varies up or down in frequency over a fixed period of time by a modulating signal. Frequency difference between the receive signal and the transmit signal increases with delay, and hence with distance. Signals reflected by a target are then mixed with the transmitted signal to produce a beat signal which will give the distance of the target after demodulation.

FIG. 1 shows a block diagram of an apparatus that compensates radar channel length variation 100 according to an exemplary embodiment. As shown in FIG. 1, the apparatus, according to an exemplary embodiment, includes a controller 101, a power supply 102, a storage 103, a transmitter 104, and a receiver 105. However, the apparatus that compensates radar channel length variation 100 according to an exemplary embodiment is not limited to the aforementioned configuration and may be configured to include additional elements and/or omit one or more of the aforementioned elements. The apparatus that compensates radar channel length variation 100 may be implemented as part of a vehicle or as a standalone component.

The controller 101 controls the overall operation and function of the apparatus that compensates radar channel length variation 100. The controller 101 may control one or more a power supply 102, a storage 103, a transmitter 104, and a receiver 105 of the apparatus that compensates radar channel length variation 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the power supply 102, the storage 103, the transmitter 104, and the receiver 105 of the that compensates radar channel length variation 100. The information may be sent and received via a bus or network, or may be directly read or written to/from one or more of the power supply 102, the storage 103, the transmitter 104, and the receiver 105 of the apparatus that compensates radar channel length variation 100 according to an exemplary embodiment. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the power supply 102, the storage 103, the transmitter 104, and the receiver 105 of the apparatus that compensates radar channel length variation 100 according to an exemplary embodiment. The power supply 102 may include one or more from among a battery, an outlet, a capacitor, a solar energy cell, a generator, a wind energy device, an alternator, etc.

The storage 103 is configured for storing information and retrieving information used by the apparatus that compensates radar channel length variation 100. The storage 103 may be controlled by the controller 101 to store and retrieve information corresponding to signals reflected off targets and compensation information. The information corresponding to signals reflected off targets may include one or more from among path length, timing, frequency, phase and amplitude. The compensation information is information used to compensate for median receive path difference and median transmit path difference. The storage 103 may also include the computer instructions configured to be executed by a processor to perform the functions of the apparatus that compensates radar channel length variation 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The transmitter 104 of the apparatus that compensates radar channel length variation 100 may include a plurality of transmitting antennas that transmit a signal to a target. The signal may be an LFMCW signal. The plurality transmitting antennas may have variable channel lengths. An LFMCW signal may be transmitted through each of the plurality of transmitting antennas. The LFMCW signal transmitted can be simplified in continuous time as:

$$s(t) = \exp(j\pi f_c t) * \exp(j\pi \alpha t^2) * \Pi\left(\frac{t}{T}\right),$$

where $f_c$ is the radar's carrier frequency in Hz, and $\alpha$ is the sweep slope in $$\text{Hz/sec}, \Pi\left(\frac{t}{T}\right)$$

is a window in time of length T [sec]. This describes a time limited signal whose instantaneous frequency is linearly increasing in time.

The receiver 105 of the apparatus that compensates radar channel length variation 100 may include a plurality receiving antennas that receive a signal reflected off a target. The signal may be an LFMCW signal. The LFMCW signal may be received in each of the plurality receiving antennas. The plurality receiving antennas may have variable channel lengths. The signal is then down-converted by multiplication with the transmitted signal and sampled in the analog to digital converter (ADC). The received signal contains the two-way time delay to the target and when multiplied with the transmitted signal, this time delay is measured through a frequency offset which can be expressed as:

$$f_0 = \tau_0 * \alpha, \quad R_0 = \frac{\tau_0}{2c}$$

where $f_0$ [Hz] is the observed frequency shift, $\tau_0$ [sec] the two-way time delay to the target, $R_0$ [m] the distance to the target and c [m/sec] is the speed of light.

The controller 101 of the apparatus that compensates radar channel length variation 100 may be configured to, for each transmitter of a plurality of transmitters, transmit a signal from the transmitter, determine a response of a plurality of receivers to the transmitted signal, and store the determined response; for each stored response of the plurality of stored responses, calculate a path length of the transmitted signal corresponding to the stored response; for each transmitter of the plurality of transmitters, determine a median difference in the path length between a transmitter and each receiver of the plurality of receivers and store a determined median receive path difference; for each receiver of the plurality of receivers, determine a median difference in the path length between a receiver and each transmitter of the plurality of transmitters and store a determined median transmit path difference; and compensate for the median receive path difference and the median transmit path difference by performing a frequency shift on or time delaying a signal to be transmitted by a transmitter or a reflected signal received by a receiver.

The controller 101 of the apparatus that compensates radar channel length variation 100 may be configured to determine the response of M receivers by determining one or more from among a time of flight, an amplitude, and a phase of a signal transmitted by the transmitter and received by a receiver after the signal is reflected off a reference target and received by the receiver.

The controller 101 of the apparatus that compensates radar channel length variation 100 may be configured to compensate for the median receive path difference and the median transmit path difference by time delaying a signal.

The controller 101 of the apparatus that compensates radar channel length variation 100 may be configured to compensate for the median receive path difference and the median transmit path difference by applying a correcting frequency shift based on the median receive path difference and the median transmit path difference.

The controller 101 of the apparatus that compensates radar channel length variation 100 may be configured to compensate for the median receive path difference and the median transmit path difference by applying a frequency shift by multiplication with a single tone exponent superimposed on windowing coefficients before performing a range Fast Fourier Transform.

The controller 101 of the apparatus that compensates radar channel length variation 100 may be configured to compensate for the median receive path difference and the median transmit path difference by mixing a signal using a mixer to correct frequency.

Figure 2:
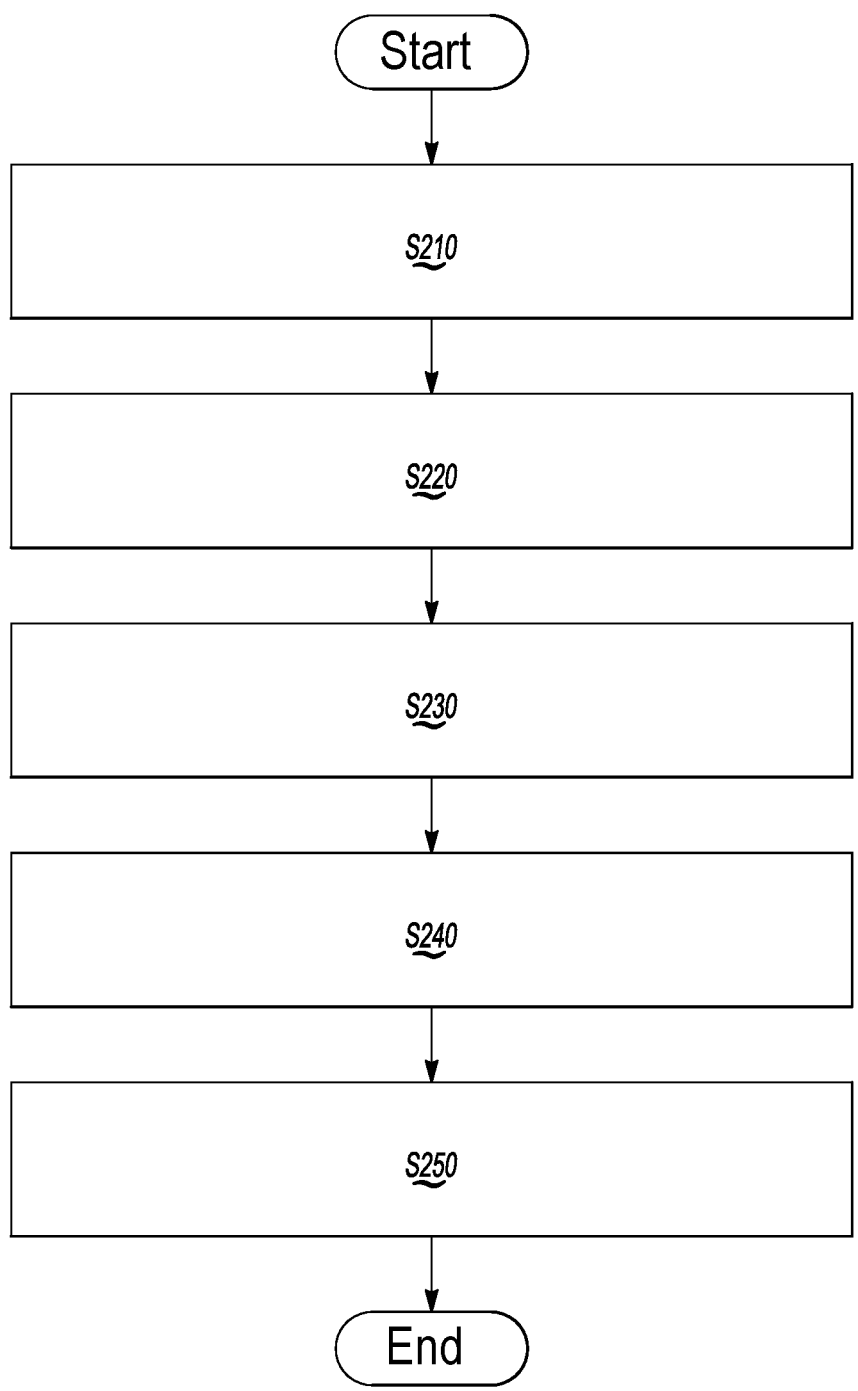
FIG. 2 shows a flowchart for a method that compensates radar channel length variation according to an exemplary embodiment.

FIG. 2 shows a flowchart for a method that compensates radar channel length variation according to an exemplary embodiment. The method of FIG. 2 may be performed by the apparatus that compensates radar channel length variation 100 or may be encoded into a computer readable medium as instructions that are executable by a computer to perform the method.

Referring to operation S210 of FIG. 2, for each transmitter of N transmitters, a signal is transmitted from the transmitter, a response of M receivers to the transmitted signal is determined, and the determined response is stored. In particular, one or more from among a time of flight, an amplitude, and a phase of a signal transmitted by the transmitter and received by a receiver after the signal is reflected off a reference target and received by the receiver is determined.

In operation S220, for each stored response of the M×N stored responses, a path length of the transmitted signal corresponding to the stored response is calculated. In this case, the path length is a distance a signal travels from a transmitter to a reference target and back to a receiver that receives the signal.

In operation S230, for each transmitter of the N transmitters, a median difference in the path length between a transmitter and each receiver of the M receivers is determined and the determined median receive path difference is stored.

In operation S240, for each receiver of the N receivers, a median difference in the path length between a receiver and each transmitter of the N transmitters is determined and the determined median transmit path difference is stored.

The median receive path difference and the median transmit path difference is compensated in operation S250 by performing a frequency shift on or time delaying a signal to be transmitted by a transmitter or a reflected signal received by a receiver.

The compensating for the median receive path difference and the median transmit path difference may include time delaying a signal. Moreover, the compensating for the median receive path difference and the median transmit path difference may include applying a correcting frequency shift based on the median receive path difference and the median transmit path difference. In addition, the compensating for the median receive path difference and the median transmit path difference may include applying a correcting frequency shift based on the median receive path difference and the median transmit path difference.

Figure 3:
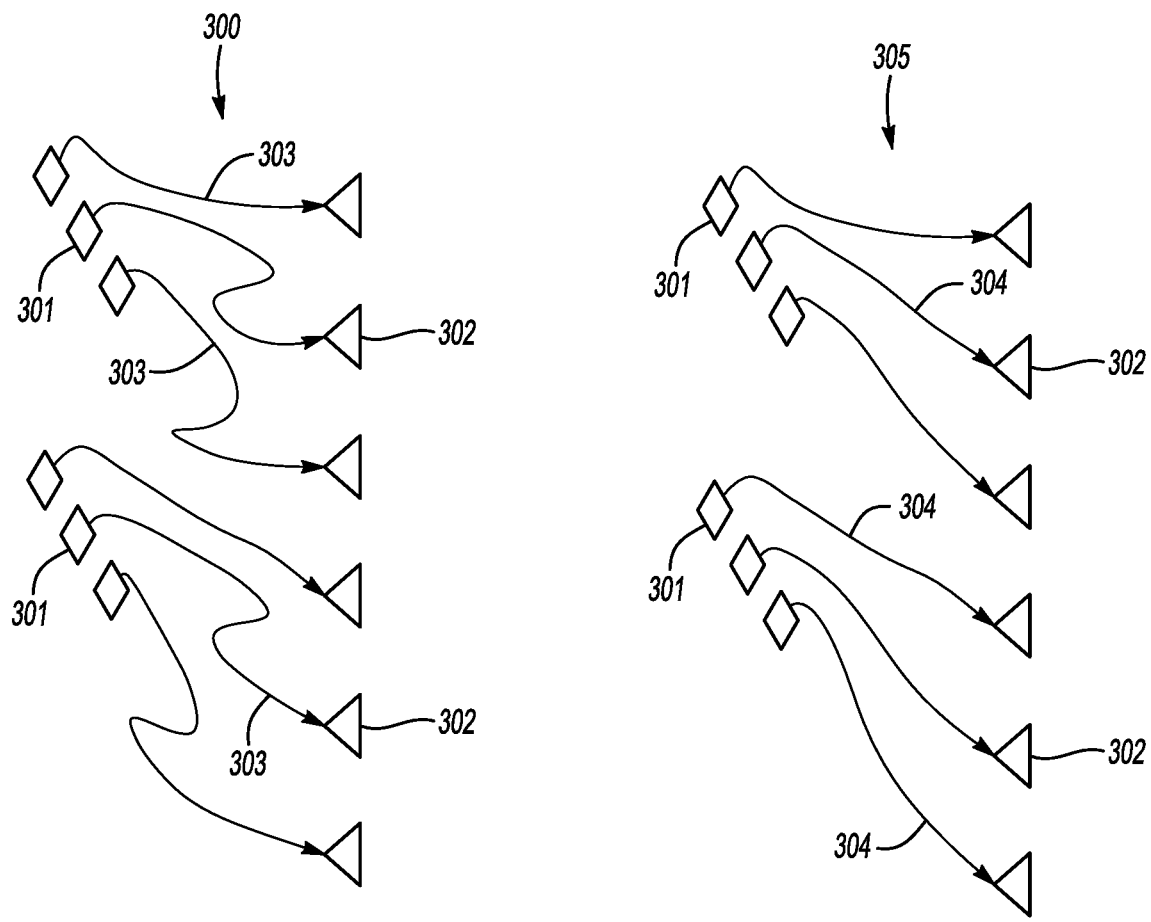
FIG. 3 shows an illustration of a circuit board including receiving and transmitting antennas with variable channel lengths according to an aspect of an exemplary embodiment.

FIG. 3 shows an illustrations of transmitting antennas layouts with uniform and variable channel lengths according to an aspect of an exemplary embodiment.

Referring to FIG. 3, a plurality of transmitter antennas 302 disposed on a circuit board in a first layout 300 have a plurality of channels 303 between the patch antennas 302 and the transmitters 301. The plurality of channel lengths 303 are designed to have a same length, thus increasing the size of the circuit and complicating the design of the circuit board layout 300. The length of the channel affects the timing of the transmission or the radar signal and the reception of the reflected radar signal. Thus, the difference in the length of the various channels affect the coherent beamforming calculation because signals transmitted and received through different channels may yield different results.

Similarly, a plurality of transmitter antennas 302 disposed on a circuit board in a second layout 305 have a plurality of variable channel lengths 304. The variable length of the channel affects the timing of the transmission or the radar signal and the reception of the reflected radar signal. Thus, the difference in the length of the various reception channels affects the coherent beamforming calculation because signals transmitted and received through different channels may yield different results. The apparatus that compensates radar channel length allows for various channel lengths by compensating for the difference in channel length, thereby allowing for more flexible design parameters, a potential reduction in circuit size, reduced microstrip losses, reduced coupling, easier to design and more accurate object detection and imaging.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method that compensates radar channel length variation, the method comprising:
   for each transmitter of N transmitters, transmitting a signal from the transmitter, determining a response of M receivers to the transmitted signal, and storing the determined response;
   for each stored response of the M×N stored responses, calculating a path length of the transmitted signal corresponding to the stored response;
   for each transmitter of the N transmitters, determining a median difference in the path length between a transmitter and each receiver of the M receivers and storing a determined median receive path difference;
   for each receiver of the N receivers, determining a median difference in the path length between a receiver and each transmitter of the N transmitters and storing a determined median transmit path difference; and
   compensating for the median receive path difference and the median transmit path difference by performing a frequency shift on or time delaying a signal to be transmitted by a transmitter or a reflected signal received by a receiver.

2. The method of claim 1, wherein the determining the response of M receivers comprises determining one or more from among a time of flight, an amplitude, and a phase of a signal transmitted by the transmitter and received by a receiver after the signal is reflected off a reference target and received by the receiver.

3. The method of claim 1, wherein the compensating for the median receive path difference and the median transmit path difference comprises time delaying a signal.

4. The method of claim 1, wherein the compensating for the median receive path difference and the median transmit path difference comprises applying a correcting frequency shift based on the median receive path difference and the median transmit path difference.

5. The method of claim 1, wherein the compensating for the median receive path difference and the median transmit path difference comprises applying a frequency shift by multiplication with a single tone exponent superimposed on windowing coefficients before performing a range Fast Fourier Transform.

6. The method of claim 1, wherein the compensating for the median receive path difference and the median transmit path difference comprises mixing a signal using a mixer to correct frequency.

7. The method of claim 1, wherein the path length comprises a distance a signal travels from a transmitter to a reference target and back to a receiver that receives the signal.

8. A non-transitory computer readable medium comprising computer executable instructions executable by a processor to perform a method, the method comprising:
   for each transmitter of N transmitters, transmitting a signal from the transmitter, determining a response of M receivers to the transmitted signal, and storing the determined response;
   for each stored response of the M×N stored responses, calculating a path length of the transmitted signal corresponding to the stored response;

for each transmitter of the N transmitters, determining a median difference in the path length between a transmitter and each receiver of the M receivers and storing a determined median receive path difference;

for each receiver of the N receivers, determining a median difference in the path length between a receiver and each transmitter of the N transmitters and storing a determined median transmit path difference; and compensating for the median receive path difference and the median transmit path difference by performing a frequency shift on or time delaying a signal to be transmitted by a transmitter or a reflected signal received by a receiver.

9. The non-transitory computer readable medium of claim 8, wherein the determining the response of M receivers comprises determining one or more from among a time of flight, an amplitude, and a phase of a signal transmitted by the transmitter and received by a receiver after the signal is reflected off a reference target and received by the receiver.

10. The non-transitory computer readable medium of claim 8, wherein the compensating for the median receive path difference and the median transmit path difference comprises time delaying a signal.

11. The non-transitory computer readable medium of claim 8, wherein the compensating for the median receive path difference and the median transmit path difference comprises applying a correcting frequency shift based on the median receive path difference and the median transmit path difference.

12. The non-transitory computer readable medium of claim 8, wherein the compensating for the median receive path difference and the median transmit path difference comprises applying a frequency shift by multiplication with a single tone exponent superimposed on windowing coefficients before performing a range Fast Fourier Transform.

13. The non-transitory computer readable medium of claim 8, wherein the compensating for the median receive path difference and the median transmit path difference comprises mixing a signal using a mixer to correct frequency.

14. The non-transitory computer readable medium of claim 8, wherein the path length comprises a distance a signal travels from a transmitter to a reference target and back to a receiver that receives the signal.

15. An apparatus that compensates radar channel length variation, the apparatus comprising:

N transmitters with variable channel lengths, where is N greater than or equal to 2;

M receivers with variable channel lengths, where is M greater than or equal to 2;

at least one memory comprising computer executable instructions; and at least one processor configured to read and execute the computer executable instructions, the computer executable instructions causing the at least one processor to:

for each transmitter of the N transmitters, transmit a signal from the transmitter, determine a response of the M receivers to the transmitted signal, and store the determined response;

for each stored response of the M×N stored responses, calculate a path length of the transmitted signal corresponding to the stored response;

for each transmitter of the N transmitters, determine a median difference in the path length between a transmitter and each receiver of the M receivers and store a determined median receive path difference;

for each receiver of the M receivers, determine a median difference in the path length between a receiver and each transmitter of the N transmitters and store a determined median transmit path difference; and compensate for the median receive path difference and the median transmit path difference by performing a frequency shift on or time delaying a signal to be transmitted by a transmitter or a reflected signal received by a receiver.

16. The apparatus of claim 15, wherein the computer executable instructions further cause the at least one processor to determine the response of M receivers by determining one or more from among a time of flight, an amplitude, and a phase of a signal transmitted by the transmitter and received by a receiver after the signal is reflected off a reference target and received by the receiver.

17. The apparatus of claim 15, wherein the computer executable instructions further cause the at least one processor to compensate for the median receive path difference and the median transmit path difference by time delaying a signal.

18. The apparatus of claim 15, wherein the computer executable instructions further cause the at least one processor to compensate for the median receive path difference and the median transmit path difference by applying a correcting frequency shift based on the median receive path difference and the median transmit path difference.

19. The apparatus of claim 15, wherein the computer executable instructions further cause the at least one processor to compensate for the median receive path difference and the median transmit path difference by applying a frequency shift by multiplication with a single tone exponent superimposed on windowing coefficients before performing a range Fast Fourier Transform.

20. The apparatus of claim 15, wherein the computer executable instructions further cause the at least one processor to compensate for the median receive path difference and the median transmit path difference by mixing a signal using a mixer to correct frequency.

* * * * *